(12) United States Patent
Tung et al.

(10) Patent No.: US 7,878,858 B1
(45) Date of Patent: Feb. 1, 2011

(54) N-IN-1 CARD CONNECTOR

(75) Inventors: Chang-Hsien Tung, Tu-Cheng (TW);
Tzu-Ching Tsai, Tu-Cheng (TW);
Kuo-Chun Hsu, Tu-Cheng (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 12/833,034

(22) Filed: Jul. 9, 2010

(30) Foreign Application Priority Data

Jul. 9, 2009 (TW) .................................. 98212508

(51) Int. Cl.
*H01R 24/00* (2006.01)

(52) U.S. Cl. ...................................................... 439/630
(58) Field of Classification Search .................. 439/630, 439/159

See application file for complete search history.

(56) References Cited

U.S. PATENT DOCUMENTS 7,448,912 B1 * 11/2008 Shiue et al. ................. 439/630

7,540,783 B2 * 6/2009 Lai et al. ..................... 439/630

FOREIGN PATENT DOCUMENTS

CN          2829137         10/2006

\* cited by examiner

*Primary Examiner*—Tho D Ta
(74) *Attorney, Agent, or Firm*—Ming Chieh Chang; Wei Te Chung; Andrew C. Cheng

(57) ABSTRACT

An N-in-1 card connector (100), used for receiving at least two cards (a MS card A and a SD card B), includes an insulative housing (10), a number of first terminals (40) retained in the insulative housing, an ejector comprising a slider (30) moveably attached to the insulative housing, a floating member (60) floatingly received in the insulative housing and a plurality of second terminals (50) having respective parts retained with the floating member. The floating member remains at a lower position to stay clear of a first, narrower card (A) and is moveable to an upper position by a second, wider card (B). The second terminals are moveable together with the floating member at the upper position for engaging the second card.

14 Claims, 8 Drawing Sheets

N-IN-1 CARD CONNECTOR

BACKGROUND OF THE INVENTION

1. Field of the Invention

The present invention relates generally to a card connector, and more particularly to an N-in-1 card connector capable of receiving multiple cards effectively, without interference therebetween.

2. Description of Related Arts

Chinese Patent No. 2829137 issued to Taishuo on Oct. 18, 2006 discloses an N-in-1 card connector, which comprises a casing forming more than two receiving spaces for inserting cards and more than two sets of terminals retaining in the casing and extending toward into the corresponding respective spaces for engaging with the cards. A second set of terminals is positioned on the bottom of the front end of the casing and is backwards, upwards and elastically tilted from the lower part of the casing, used for engaging with a mating card. The card connector further comprises a pressing plate, both ends of which are movably arranged in the casing and can move upwards and downwards. The pressing plate is provided with a plurality of hollowed parts. The second set of terminals has a plurality of contacting portions passing upwards through the hollowed parts and being exposed on the pressing plate. The pressing plate is supported by the second set of terminals and is positioned in an upper position when a mating card is not inserted. The pressing plate is pressed by the mating card to be located at a lower position and the terminals are compressed to have elasticity. The terminals can release elasticity and the pressing plate return to the original position when the card is removed. After a period of use, the elasticity of the terminals may become weaken, and the pressing plate supported by the terminals may not return to the original position. The second card can be durably used with the card connector to transmit signals to a mother circuit board through the card connector.

Hence, an improved card connector is desired to overcome the aforementioned disadvantage of the prior art.

SUMMARY OF THE INVENTION

Accordingly, an object of the present invention is to provide a card connector effectively, durably connect with inserted cards.

To achieve the above object, An N-in-1 card connector, used for receiving at least two cards, includes an insulative housing, a number of first terminals retained in the insulative housing, an ejector comprising a slider moveably attached to the insulative housing, a floating member floatingly received in the insulative housing and a plurality of second terminals having respective parts retained with the floating member. The floating member remains at a lower position to stay clear of a first, narrower card and is moveable to an upper position by a second, wider card. The second terminals are moveable together with the floating member at the upper position for engaging the second card.

Other objects, advantages and novel features of the invention will become more apparent from the following detailed description when taken in conjunction with the accompanying drawings.

DETAILED DESCRIPTION OF THE PREFERRED EMBODIMENT

Figure 1:
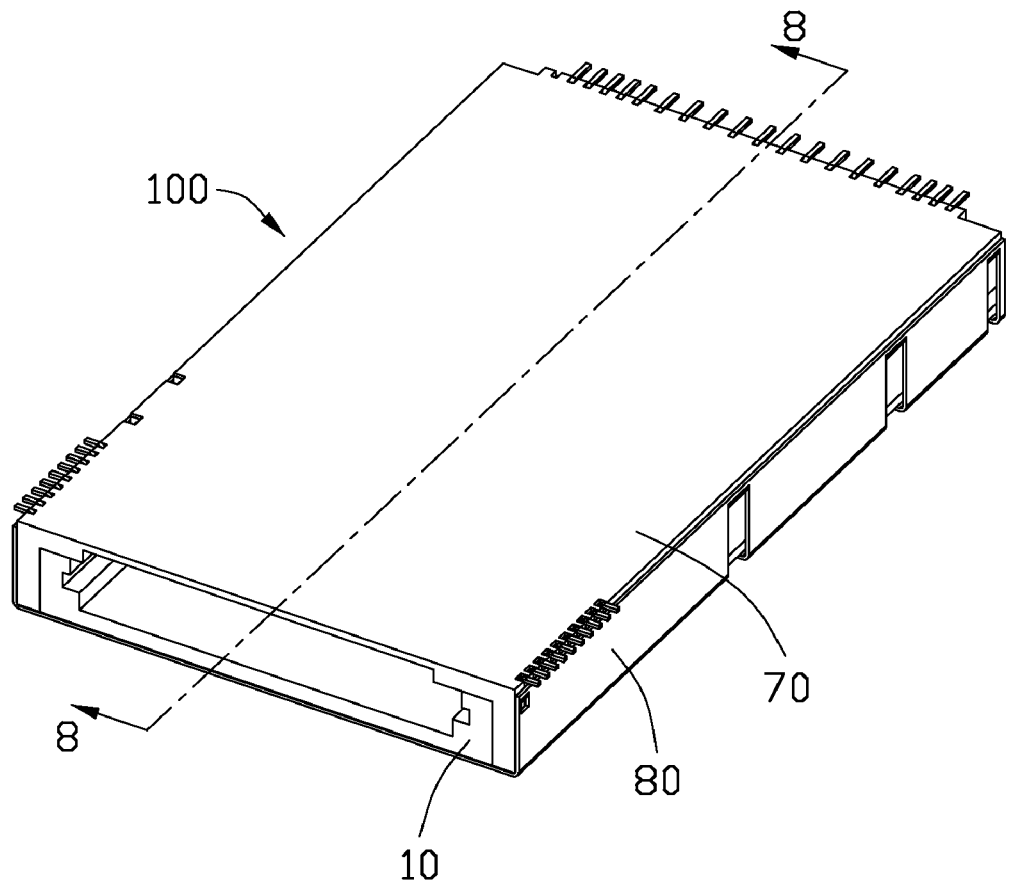
FIG. 1 is a perspective, assembled view of a card connector constructed in accordance with the present invention.

Reference will now be made in detail to the preferred embodiment of the present invention.

Referring to FIGS. 1-8, an N-in-1 card connector 100 of the present invention is used for receiving at least two cards respectively as a first card A and a second card B. The first card A is preferably a MS (Memory Stick) card and the second card B is preferably a SD (Secure Digital Memory) card in this embodiment. The SD card B has a length shorter than that of the MS card A, while the MS card A has a width narrower than that of the SD card B. Other than the MS card A and the SD card B, the card connector 100 preferably receives a third card (not shown) of a XD (XD-Picture) card additionally. The card connector 100 includes an insulative housing 10, a plurality of first terminals 40 and a plurality of third terminals 20 received in the insulative housing 10, a slider 30 moveably attached to the insulative housing 10, a floating member 60 capable of moving upwards and downwards relative to the insulative housing 10, a plurality of second terminals 50 having respective parts retained in the floating member 60, a top, plastic shell 70 and a bottom, metallic shell 80 attaching to the insulative housing 10. The top shell 70 covers the slider 30 and the insulative housing 10 for defining three card receiving rooms 107, 106, 102, which respectively receives the MS card A, the SD card B, and the XD card. The three card receiving rooms 107, 106, 102 are in communication with each other and the three cards are inserted into the three card receiving rooms 107, 106, 102 along a same direction through a same card inserting port.

Referring to FIGS. 2-5, the insulative housing 10 is plastic. The insulative housing 10 comprises a base portion 101 and a pair of lateral walls 103 extending upwards from the lateral edges of the base portion 101. The insulative housing 10 has a front part, a middle part, and a rear part thereof, taking along the card's insertion direction. The first terminals 40 are assembled at the front part of the insulative housing 10. The third terminals 20 are insert-molded at the rear part of the insulative housing 10. The front part of the insulative housing 10 defines a front depressed cavity 104 and the middle part of the insulative housing 10 defines a middle depressed cavity 105. The first terminals 40 are linearly arranged and comprise a plurality of first soldering portions 403 extending forwards and being exposed out of the insulative housing 10 for soldering with a printed circuit board (not shown) and a plurality of first contacting portions 401 extending into the front depressed cavity 104. The rear part of the insulative housing 10 cooperatively defines the third card receiving room 102. The third terminals 20 comprises a plurality of third contacting portions 201 extending into the third card receiving room 102 and a plurality of third soldering portions 203 extending out of the insulative housing 10 through the opposite lateral walls 103. The third contacting portions 201 extend along the card's insertion direction while the soldering portions 203 in two rows extend along a transverse direction perpendicular to the card's insertion direction. Each lateral wall 103 defines an aperture 108 at a front end thereof. The insulative housing 10 defines a pair of notches 1051 at two opposite sides of the middle depressed cavity 105.

Figure 2:
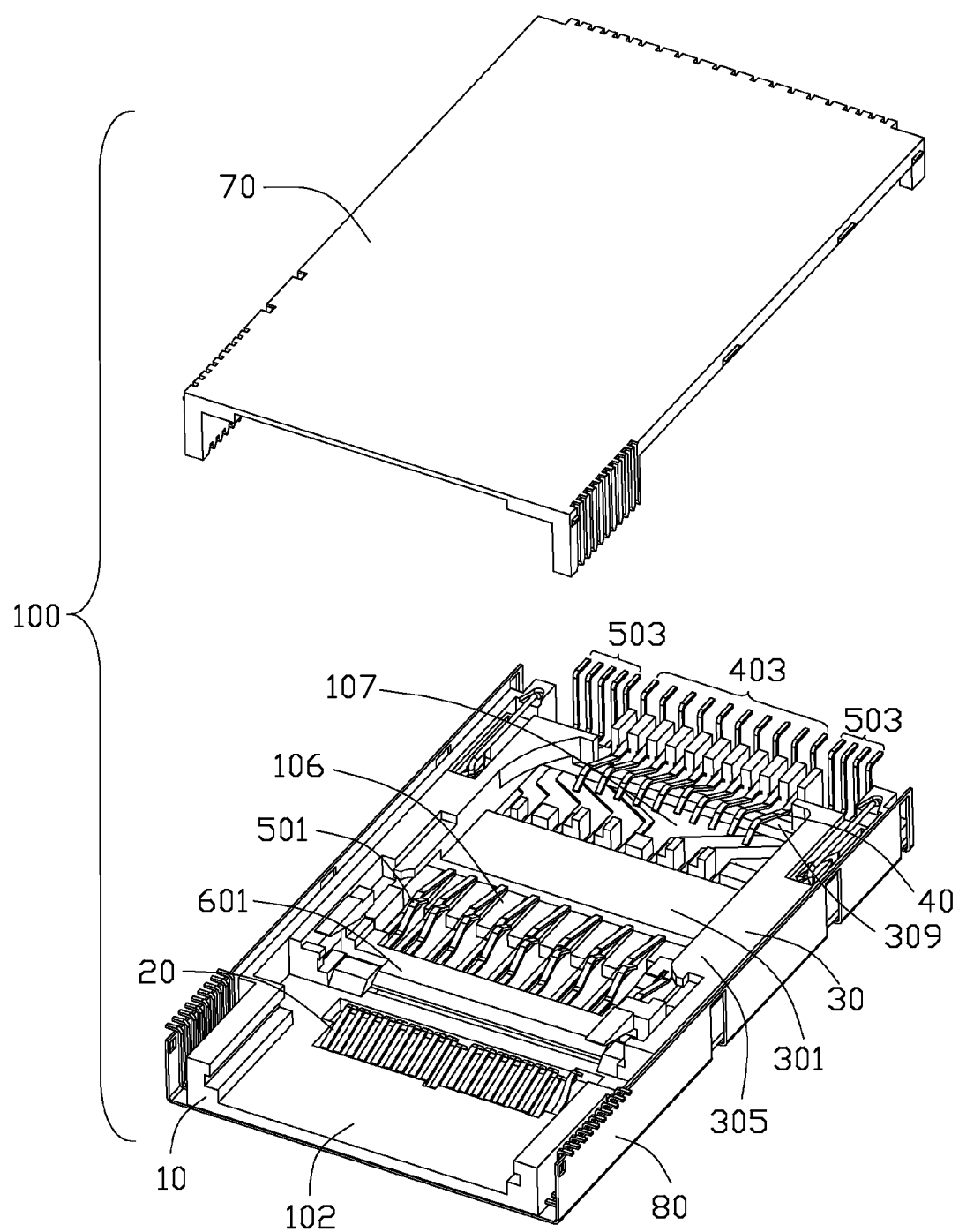
FIG. 2 is a perspective, partly assembled view of the card connector.
Figure 3:
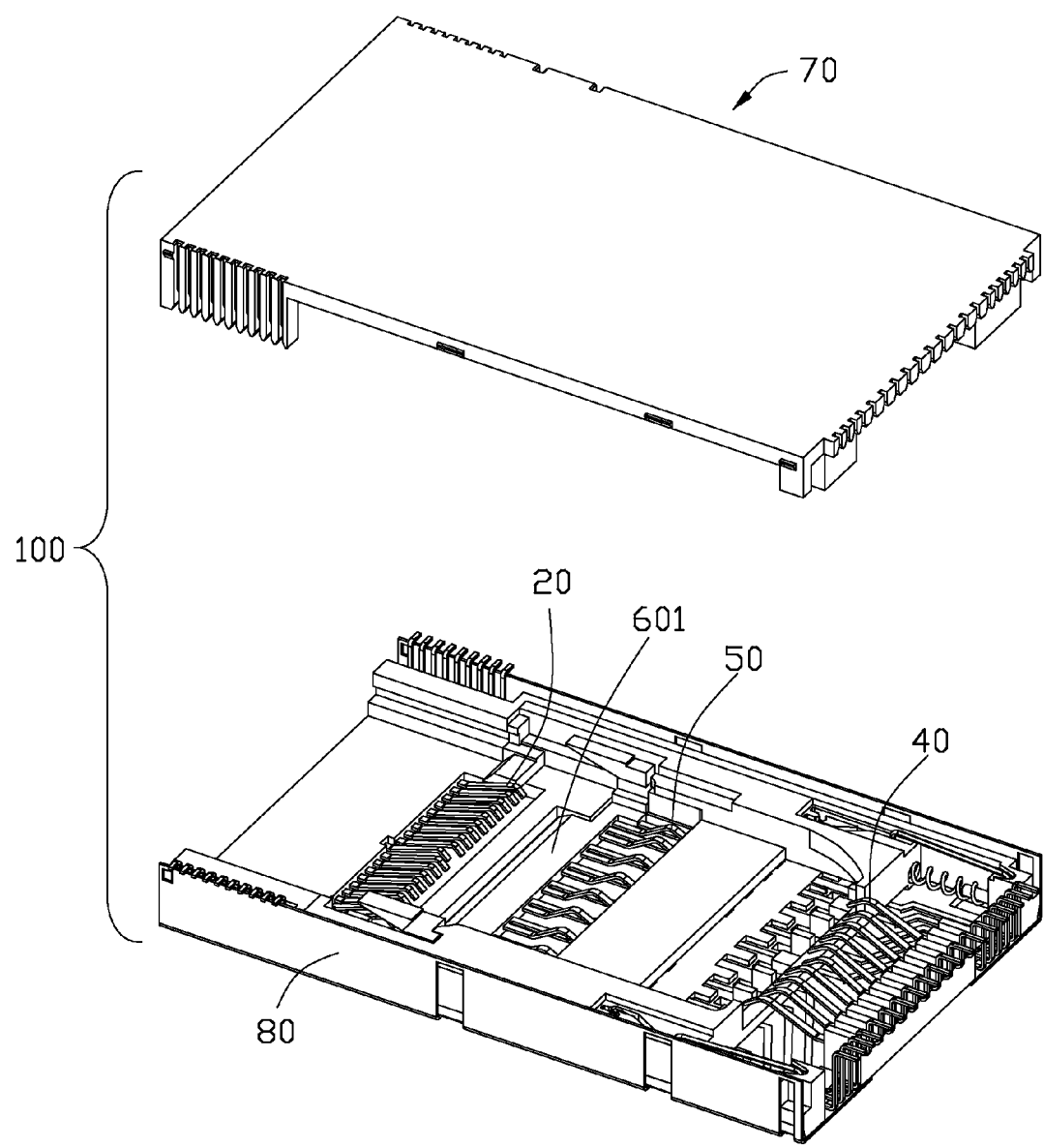
FIG. 3 is another perspective, partly assembled view of the card connector.
Figure 4:
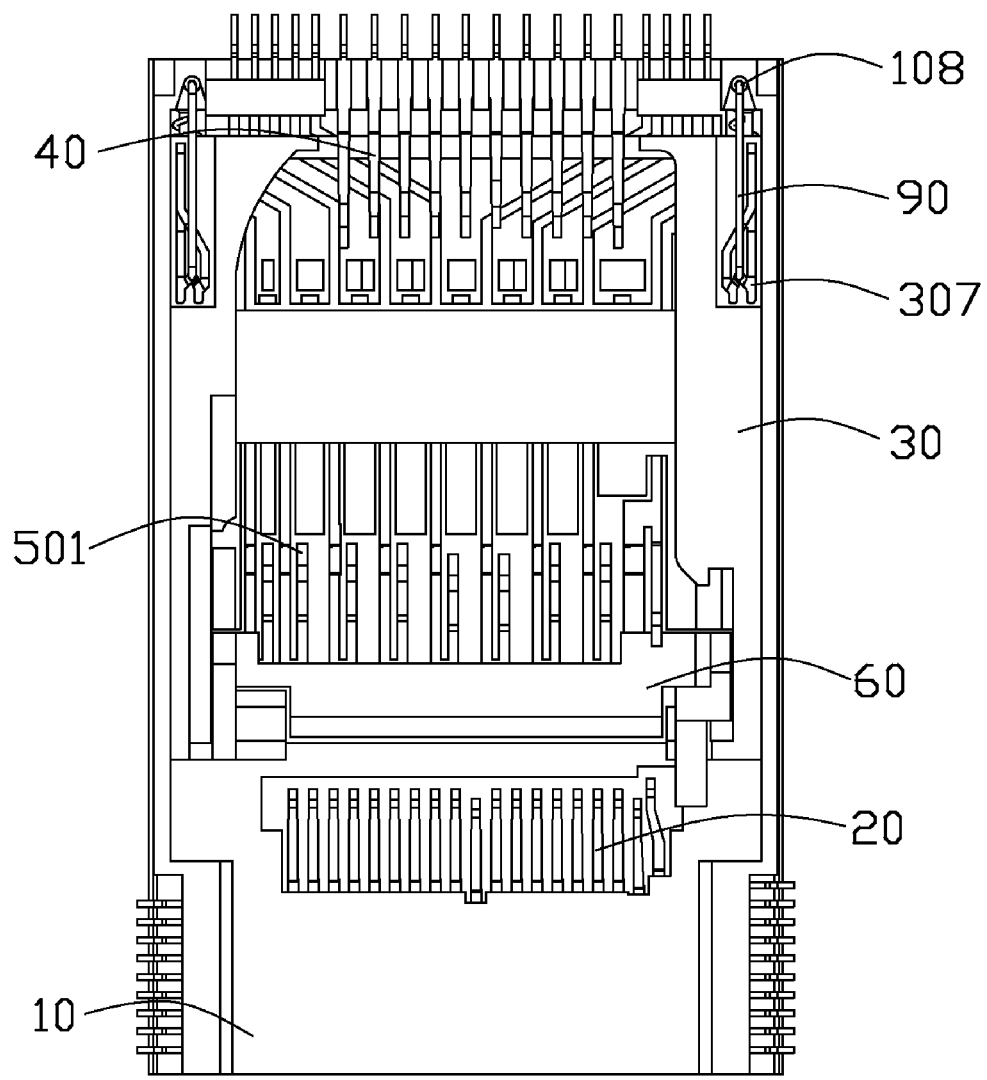
FIG. 4 is a top view of the card connector without a top shell.
Figure 5:
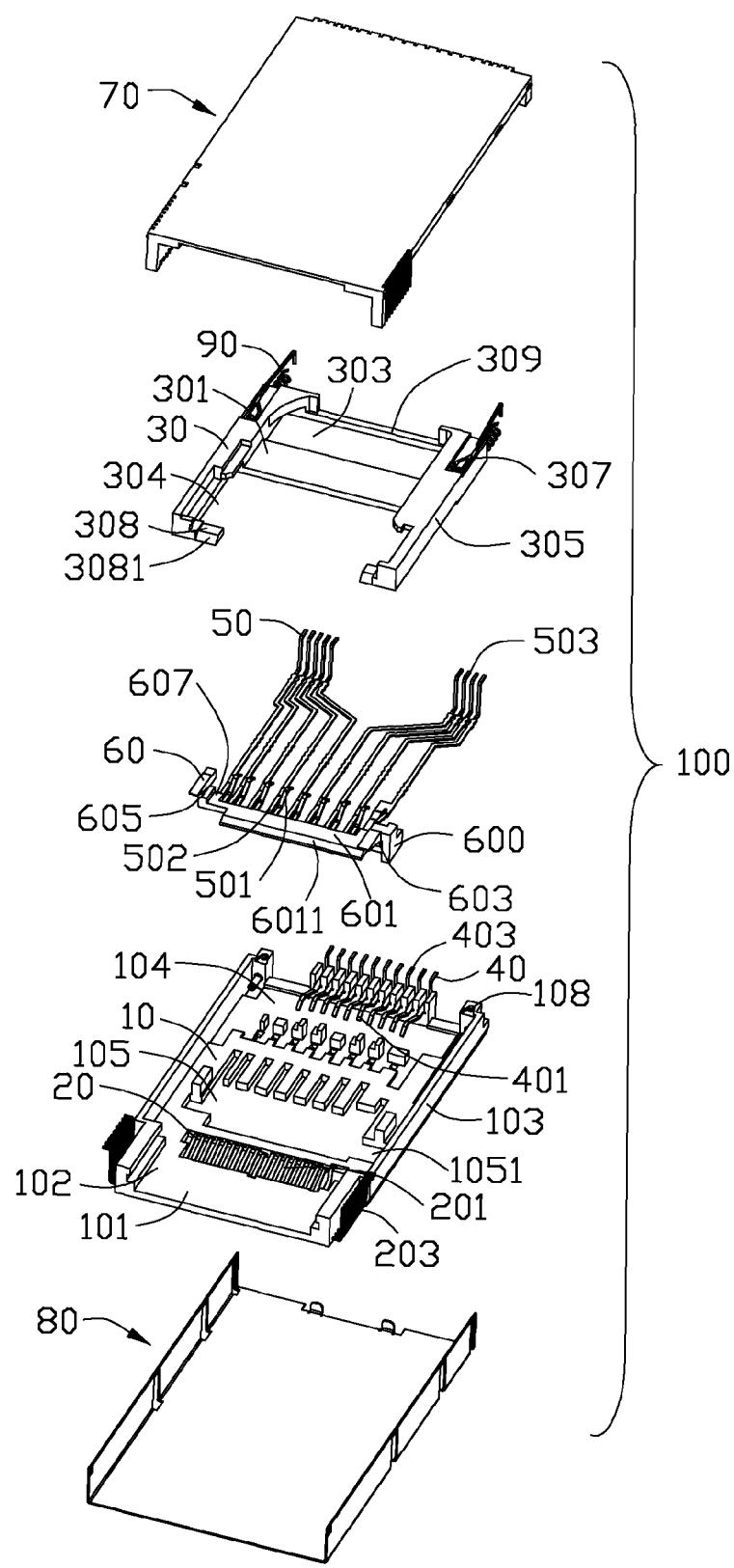
FIG. 5 is a perspective, exploded view of the card connector.
Figure 6:
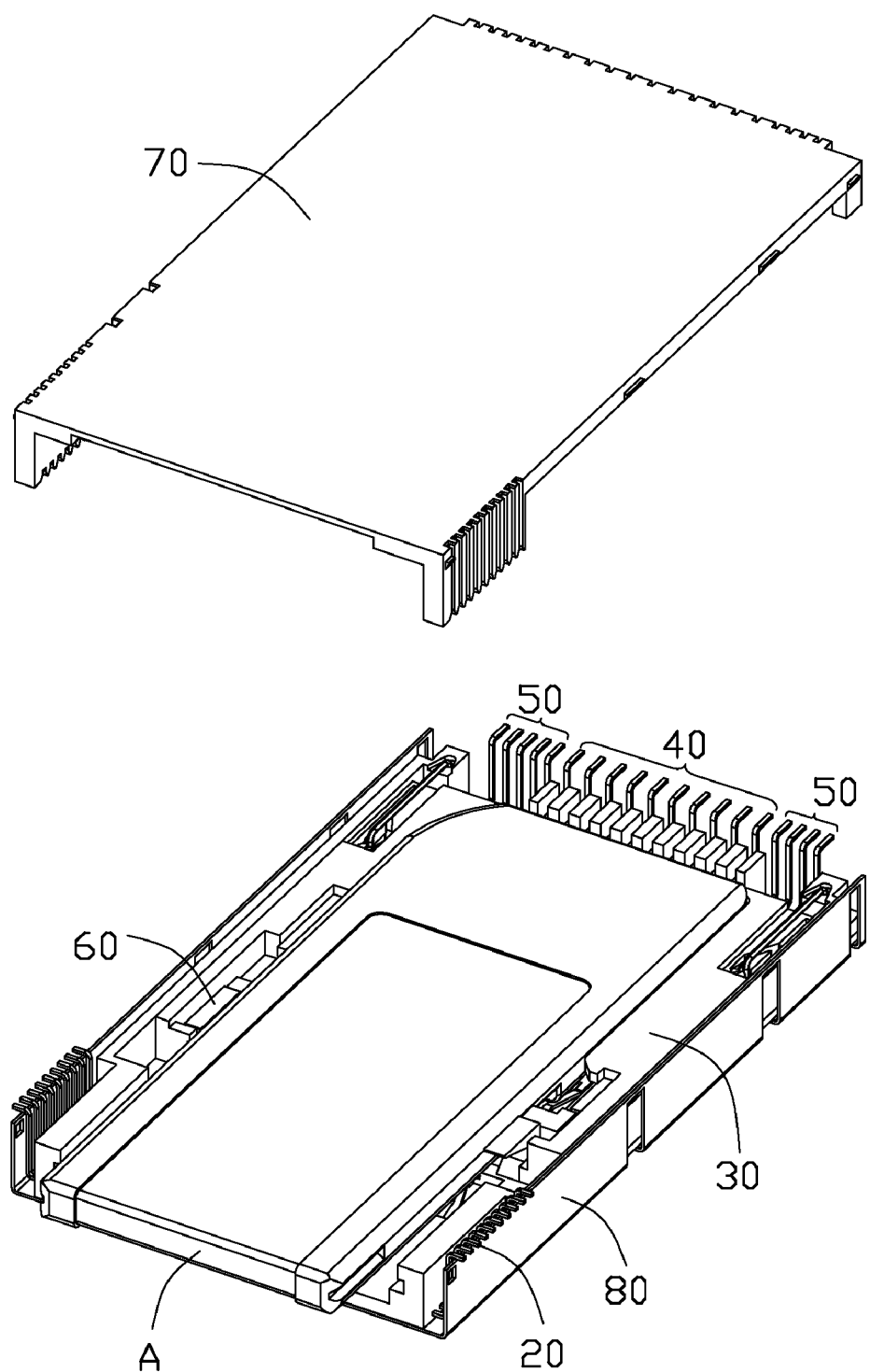
FIG. 6 is a perspective, partly exploded view of the card connector when a card A is inserted.
Figure 7:
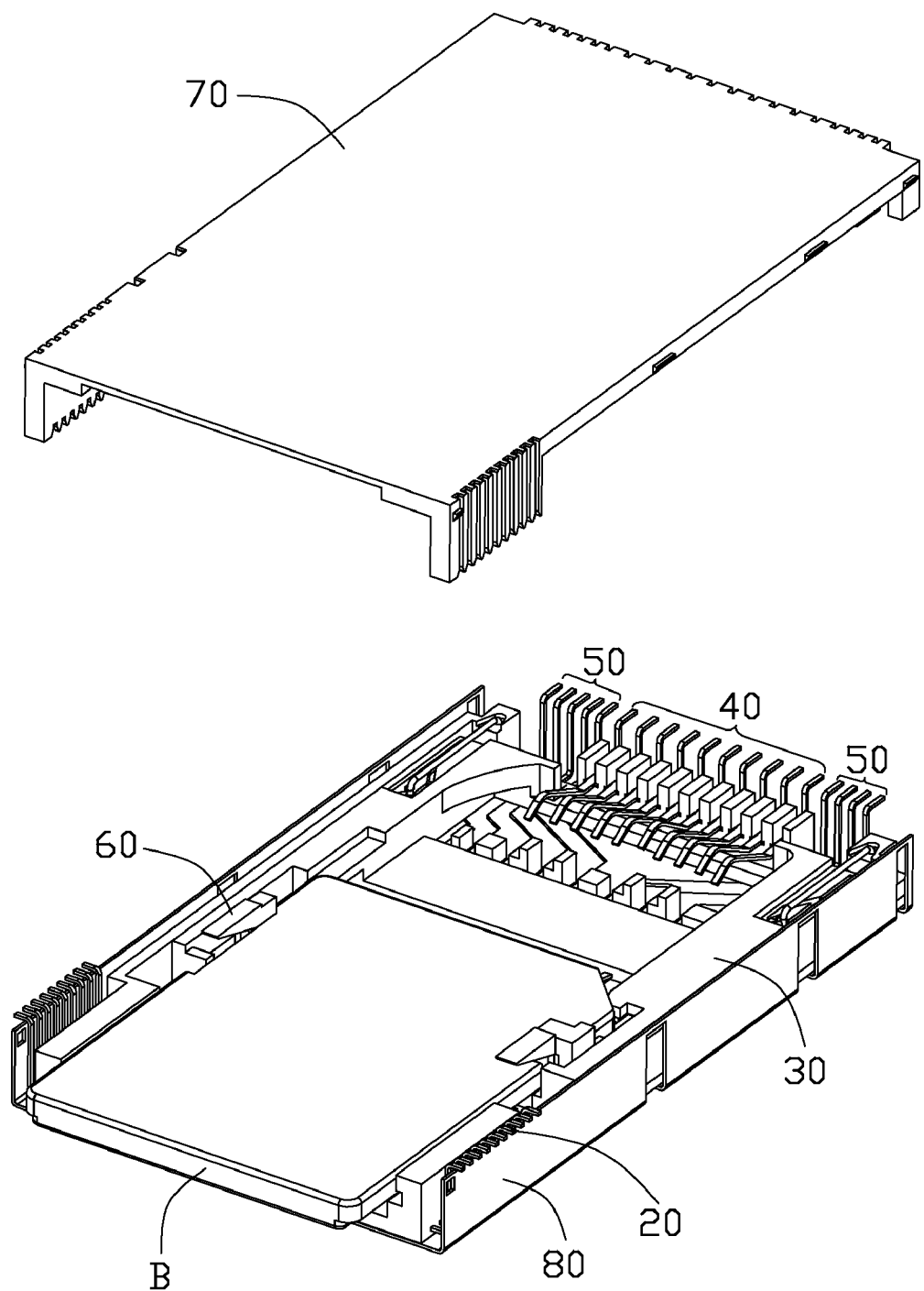
FIG. 7 is a perspective, partly exploded view of the card connector when a card B is inserted.
Figure 8:
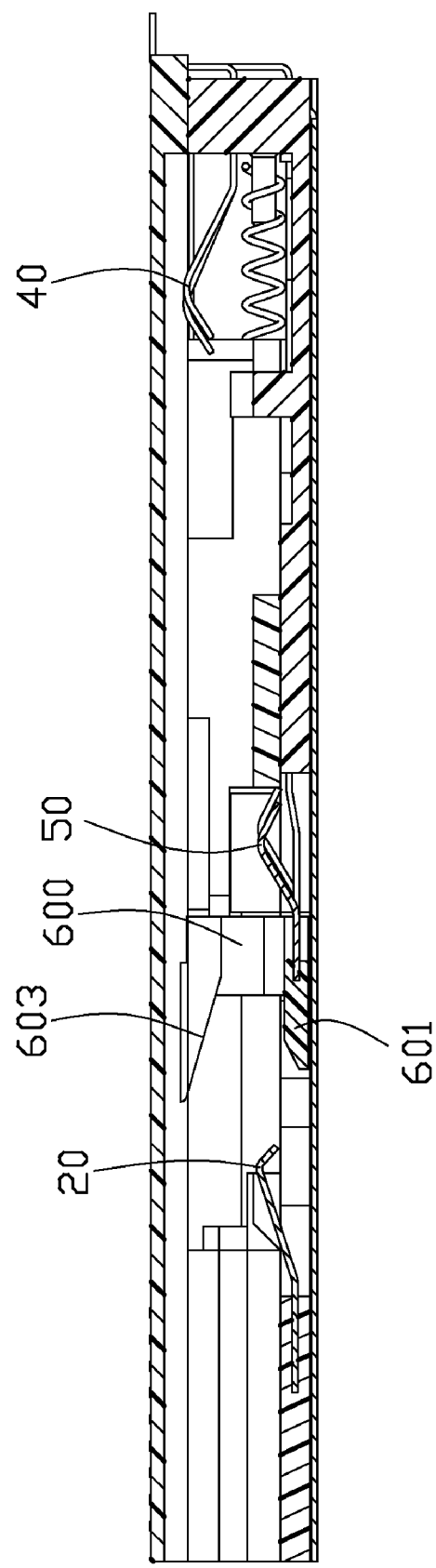
FIG. 8 is a cross-sectional view of the card connector taken along line 8-8 of FIG. 1.

Referring to FIGS. 2 and 5, the slider 30 is rectangular and comprises a pair of arms 305, a lever portion 301 connecting with the arms 305 at middle parts of the arms 305, and a linking portion 309 connecting with the arms 305 at front ends of the arms 305. The arms 305, the lever portion 301, and the linking portion 309 cooperatively define a first space 303 while the arms 305 and the lever portion 301 cooperatively define a second space 304. The two spaces 303, 304 are located at two opposite sides of the lever portion 301. Each arm 305 defines a heart-shaped slot 307 at the rear part thereof. The electrical connector 100 further comprises two pin members 90 slideably moveable along the heart-shaped slots 307. The slider 30, the two pin members 90, and two spring members (not shown) are cooperatively combined as two ejectors for the three cards. Push-push ejectors are well-known to peoples skilled in the art, and it is not described in detail herein. The arms 305 form a pair of blocks 308 at a rear part thereof, which face towards each other. Each block 308 has a first slant surface 3081 extending rearward.

Referring to FIGS. 2-5, the floating member 60 comprises a main portion 601 extending along the transverse direction relative to the card's insertion direction and a pair of latching portions 600 located at two ends of the main portion 601. The latching portion 600 defines a guiding surface 603 engaging with the SD card B and being supported by the SD card B, such that the floating member 60 moves upwards when the SD card B is inserted, and moves downwards when the SD card B is ejected. The second terminals 50 are insert-molded with the main portion 601 of the floating member 50, such that the respective parts of the second terminals 50 are able to move along with the floating member 60 upwards and downwards. The main portion 601 has a second slant surface 6011 registered with the first slant surfaces 3081 of the blocks 308 and being sandwiched between the blocks 308 when assembled. The latching portion 600 forms a first stepped portion 605 and a second stepped portion 607 lower than the first stepped portion 605, for separately, correspondingly guiding the first card A and the second card B.

Referring to FIGS. 2, 3, 5 and 8, the second terminals 50 comprise a plurality of second soldering portions 503 with two separated groups extending out of the insulative housing 10 from the front of the insulative housing 10, and a plurality of connecting portions 502 extending from the soldering portions 503 rearward and retaining in the main portion 601 of the floating member 60. The connecting portion 502 has a longer elastic portion (not labeled) connecting to the second soldering portion 503 and having large elasticity, and a shorter elastic portion (not labeled) extending reversely toward the second soldering portion 503 from the longer elastic portion. The second contacting portions 501 formed at distal ends of the shorter elastic portions, keep reliable contact with the SD card B.

Referring to FIGS. 1-8, in assembly, the connecting portions 502 of the second terminals 50 are insert-molded in the main portion 601 of the floating member 60. The third terminals are retained in the insulative housing 10. The floating member 60 is located in the middle depressed cavity 105 of the insulative housing 10 when the latching portions 600 are guided into the notches 1051 at the opposite sides of the middle depressed cavity 105. The floating member 60 is capable of moving upwards and downwards in the middle depressed cavity 105. The slider 30 is arranged in the middle part and the rear part of the insulative housing 10. The second card receiving room 106 is defined between the lever portion 301 of the slider 30 and the arms 305 of the slider 30 and the top shell 70. The first card receiving room 107 is defined between the lever portion 301, the linking portion 309, the arms 305 and the top shell 70. The second contacting portions 501 of the second terminals 50 extend into the second card receiving room 106 and facing towards the lever portion 301 of the slider 30. The second soldering portions 503 of the second terminals 50 are linearly, separately arranged at two lateral sides of the first soldering portions 403 of the first terminals 40, both extending out of the insulative housing 10. The first contacting portions 401 extends across the linking portion 309 of the slider 30, to be located in the first card receiving room 107.

Referring to FIGS. 1-8, when the third card is inserted into the third card receiving room 102, the connecting pads of the third card engage with the third contacting portions 201 of the third terminals 20 for signal transmission. The front edges of the third card confronts with the rear end of the slider 30 to drive the slider 30 for inserting/ejecting the third card. When the first card A is inserted, because the first card A has a narrower width, the first card A does not interfere with the latching portions 600, so, the floating member 60 is kept at a lower position. The first card A smoothly slides along the latching portions 600 to the front part of the card connector 100, received in the first card receiving room 107 and engages with the first contacting portions 401 of the first terminals 40. When the second card B is inserted, because the second card B has a wider width, the second card B interferes with the latching portions 600, in detail, the second card B is guided by the guiding surface 603 and causes the upward movement of the floating member 60. Accordingly, the second contacting portions 501 are moved together with the floating member 60 to the upper position for connecting with the second card B. When the card B is ejected by the ejector, the latching portion 600 disengages with the card B, and the floating member 60 returns back to the lower position. The second contacting portions 501 move downwards together with the floating member 60 when the card B is ejected.

In the present invention, because the floating member 60 engages with the wider SD card B instead of the narrower MS card A, therefore, when the MS card A is inserted, the floating member 60 as well as the second terminals 50 retained with the floating member 60 are arranged at lower positions, with no obstacles for the MS card's insertion. When the SD card B is inserted, the floating member 60 as well as the second terminals 50 retained with the floating member 60 is driven to the upper positions for engaging with the SD card B. The present invention receives three different cards at different times without interference.

While a preferred embodiment in accordance with the present invention has been shown and described, equivalent modifications and changes known to persons skilled in the art according to the spirit of the present invention are considered within the scope of the present invention as described in the appended claims.

What is claimed is:

1. An N-in-1 card connector, used for receiving at least two cards, comprising:
   an insulative housing defining at least two card receiving rooms for accommodating the cards;
   a plurality of first terminals retained in the insulative housing at a front part thereof;

an ejector comprising a slider moveably attached to the insulative housing;
a floating member floatingly received in the insulative housing; and
a plurality of second terminals having respective parts retained with the floating member; wherein
the floating member remains at a lower position to stay clear of a first, narrower card and is moveable to an upper position by a second, wider card, and the second terminals are moveable together with the floating member at the upper position for engaging the second card;
wherein the slider is slidable along a card insertion/ejection direction and the floating member is moveable along a vertical direction which is perpendicular to the card insertion/ejection direction;
wherein the floating member comprises a main portion and a pair of latching portions located at two ends of the main portion, and the second terminals comprise a plurality of second soldering portions extending out of the insulative housing, a plurality of second contacting portions extending into a corresponding card receiving room, and a plurality of connecting portions retained to the main portion of the floating member;
wherein the first terminals comprise a plurality of first soldering portions and the second soldering portions of the second terminals are linearly arranged at two lateral sides of the first soldering portions;
wherein the slider comprises a pair of arms and a lever portion connecting with the arms, and the second contacting portions of the second terminals extend towards the lever portion of the slider.

2. The N-in-1 card connector as described in claim 1, wherein each latching portion defines a guiding surface for engaging with an upper surface of the second card.

3. The N-in-1 card connector as claimed in claim 1, wherein the first card is a MS card, the second card is a SD card and the third card is a XD card.

4. The N-in-1 card connector as claimed in claim 1, further comprising a top, plastic shell covering an upper face of the insulative housing and a bottom, metallic shell attaching to a lower face of the insulative housing.

5. The N-in-1 card connector as described in claim 1, wherein the connecting portions of the second terminals have the respective parts insert-molded with the main portion of the floating member and other respective parts insert-molded with the insulative housing.

6. The N-in-1 card connector as described in claim 5, wherein the insulative housing defines a depressed cavity and a pair of notches at two opposite sides of the depressed cavity respectively receiving the main portion and the latching portions of the floating member.

7. The N-in-1 card connector as described in claim 1, wherein the slider comprises a linking portion connecting the arms, a space is defined between the arms, the lever portion and the linking portion, and the first terminals comprise a plurality of first contacting portions extending across the linking portion into the space.

8. The N-in-1 card connector as claimed in claim 7, wherein each card receiving room defines a card inserting port, and the second contacting portions are nearer to the card inserting port than the first contacting portions.

9. The N-in-1 card connector as claimed in claim 8, further comprising a plurality of third terminals forming a plurality of third contacting portions located nearer to the card inserting port than the contacting portions of the first and second terminals.

10. An N-in-1 card connector comprising:
an insulative housing defining therein a card receiving room communicating with an exterior with a front-to-back direction;
a floating member associated with the housing and up and down moveable in the card receiving room of the housing; and
a plurality of contacts defining a retaining section fixed to the housing, a soldering section extending outwardly from the retaining section, and connecting portion extending inwardly from the retaining section; wherein the connecting portion defines a long elastic portion connecting said retaining section and the floating member so as to provide a gentle force upon the floating member to allow dedicate up-and-down movement of the floating member between an initial position which is farther from the receiving room and an operation position which is closer to the receiving room, and further defines a short elastic portion extending from the long elastic portion around the floating member so as to contact and provide a sufficient normal force upon an electrical card which is inserted into the receiving room and moves the floating member to the operation position;
wherein the long elastic portion extends from the retaining section toward the floating member in a direction while the short elastic portion extends from the floating member toward the retaining section in an opposite direction essentially.

11. The N-in-1 card connector as claimed in claim 10, wherein the short elastic portion keeps a constant joint with regard to the floating member disregarding the floating member is in either the initial position or the operation position.

12. The N-in-1 card connector as claimed in claim 10, wherein the floating member includes a pair of latching portions at two lateral ends to be actuated by two side region of said card for urging the floating member toward the operation position from the initial position.

13. The N-in-1 card connector as claimed in claim 10, wherein said contacts are insert-within the housing via the retaining sections.

14. An N-in-1 card connector for use with an electronic card, comprising:
an insulative housing defining a card receiving room;
a plurality of contacts assembled to the housing, each of said contact defining a resilient contact arm for engagement with said electronic card;
a floating member associated with the housing and up and down moveable in the card receiving room by said electronic card to actuate said contact arm to move into the card receiving room; and
a slider disposed in the housing and back and forth moveable along a front-to-back direction, said slider having engagement means for laterally inwardly extending into the card receiving room for engagement with the electronic card; wherein
said slider extends across said housing in a transverse direction, and each of said contacts has a connection portion linked to the floating member and partially between said slider and the housing in a vertical direction;
wherein said slider includes a pair of side arms each equipped with said engagement means.

* * * * *